June 12, 1934.   J. W. BRYCE ET AL   1,962,732
RECORD CONTROLLED PUNCHING MACHINE
Filed April 20, 1933   8 Sheets-Sheet 1

FIG.1.

INVENTORS
James W. Bryce
Henry L. Haltermann
BY
W. M. Wilson
ATTORNEY

June 12, 1934.  J. W. BRYCE ET AL  1,962,732
RECORD CONTROLLED PUNCHING MACHINE
Filed April 20, 1933    8 Sheets-Sheet 2

June 12, 1934.  J. W. BRYCE ET AL  1,962,732
RECORD CONTROLLED PUNCHING MACHINE
Filed April 20, 1933   8 Sheets-Sheet 3

INVENTORS
James W. Bryce
Henry L. Halterman
BY
W. M. Wilson
ATTORNEY

June 12, 1934.                J. W. BRYCE ET AL                1,962,732
                        RECORD CONTROLLED PUNCHING MACHINE
                        Filed April 20, 1933          8 Sheets-Sheet 5

INVENTORS
James W. Bryce
Henry L. Hattermann
BY
W. M. Wilson
ATTORNEY

Patented June 12, 1934

1,962,732

UNITED STATES PATENT OFFICE 1,962,732

RECORD CONTROLLED PUNCHING MACHINE

James W. Bryce, Bloomfield, N. J., and Henry L. Haltermann, Binghamton, N. Y., assignors, by mesne assignments, to International Business Machines Corporation, New York, N. Y., a corporation of New York Application April 20, 1933, Serial No. 667,024

12 Claims. (Cl. 164—115)

This invention relates to punching machines and more particularly to punching machines adapted to perforate record cards of the well known Hollerith type.

The principal object of the invention is to provide mechanism for automatically operating a punching machine under control of original records upon which data have been entered in graphic form. Heretofore punching machines of the type to which the present invention is particularly adapted have been automatically operated to produce perforated records under control of other perforated records. Such a machine is fully shown and described in the patent to Lake and Daly, No. 1,914,263, issued June 13, 1933. In accordance with the present invention it is proposed to cause a punching machine to produce perforated records under control of either other perforated records or records upon which graphic representations are made or under control of records having both perforations and graphic representations. The invention will be described in connection with and with particular reference to the operation of a public utility accounting system, but it will be understood that the invention is not limited to such application but may be employed for many other uses and in many other systems.

Heretofore, meter readers have been provided with books or the like in which they entered the reading of the electric meter, gas meter, water meter, etc., on a particular page or section assigned to a particular user. This book was later returned to the accounting department where a punch operator prepared a perforated record in accordance with the readings entered in the meter reader's book. This method of preparing a perforated record is slow and requires additional checking or verifying operations to insure the accuracy of the perforations, which is both expensive and time consuming.

In accordance with the present invention it is proposed to furnish the meter reader with a set of cards having a number of columns, each of which is provided with the usual twelve index point positions of the Hollerith system, for recording digits. These cards are also printed with the user's name, address and account number. The account number may be pre-punched in the index point positions of certain columns or instead of perforations, marks in the form of short dashes may be made in the proper index point positions. Upon reading the meter for a particular user, it is only necessary for the meter reader to enter marks in the appropriate index point positions in several of the columns indicative of the numerical reading of the meter. If desired, a hole may be made in the selected positions as with a stylus or hand punch. These cards are later returned to the accounting department where they are placed in the sensing unit of the machine. Other record cards are placed in the punch section of the machine, the two sets of cards having previously been arranged in sequential order. The cards are then concurrently fed through their respective sections of the machine and a comparison may first be made between the first card in the sensing section and the first card in the punching section. If they are found to be in agreement; that is, if both have the same account number entered therein, punching in the second card will automatically take place under control of the marks or holes made in the first card by the meter reader. These perforations will consist of the entry of the "previous" month's reading in one field of the card and the entry of the "present" reading in another field of the record card. The perforated cards are then ready for passage through other accounting machines which will compute the difference between the two readings, namely, the consumption, which will then be multiplied by the rate to determine the charges for the service. These data will be further utilized in the preparation of the bill to be subsequently sent to the user.

A more specific object of the invention is to provide an improved system for analyzing graphic representations in index point positions in a record card and for controlling the operation of a punching machine to reproduce the analyzed data in another form in another record card.

A further object is to provide improved comparing mechanism for comparing graphic representations in one record card with perforate representations in another card and for controlling the operation of the machine in accordance with the result of the comparison.

A further object of the invention is to provide signalling means for indicating the occurrence of more than a predetermined number of entries in a single column of the record being analyzed.

A further object of the invention is to provide improved electrical circuits in connection with a plurality of light sensitive cells for analyzing marks made in the index point positions of a record.

Another object is to provide time delay devices in the reading circuits of the machine to permit the amplifying tubes to assume their full operating characteristics.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

Figure 10:
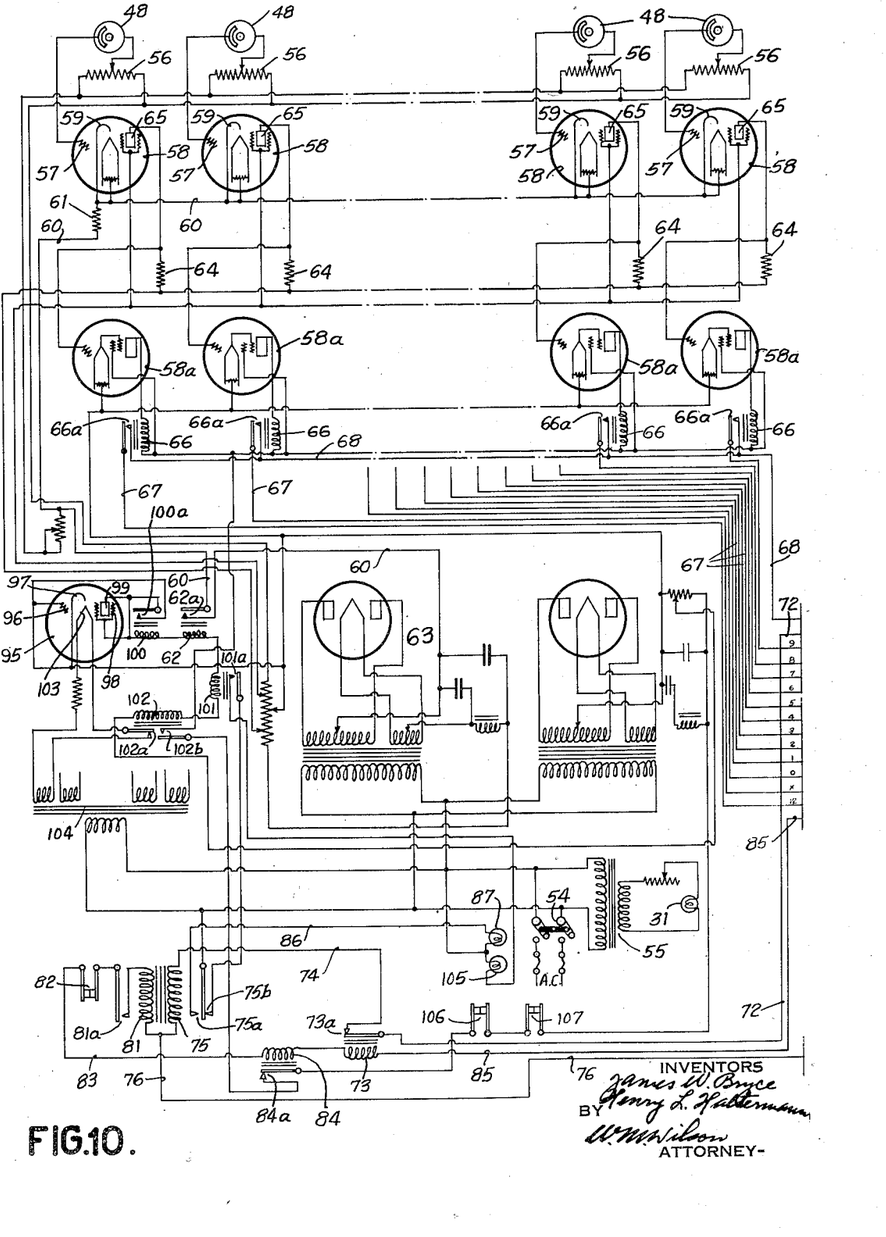
Figs. 10 and 10a, placed side by side, comprise a wiring diagram of the electric circuits of the machine.
Figure 10A:
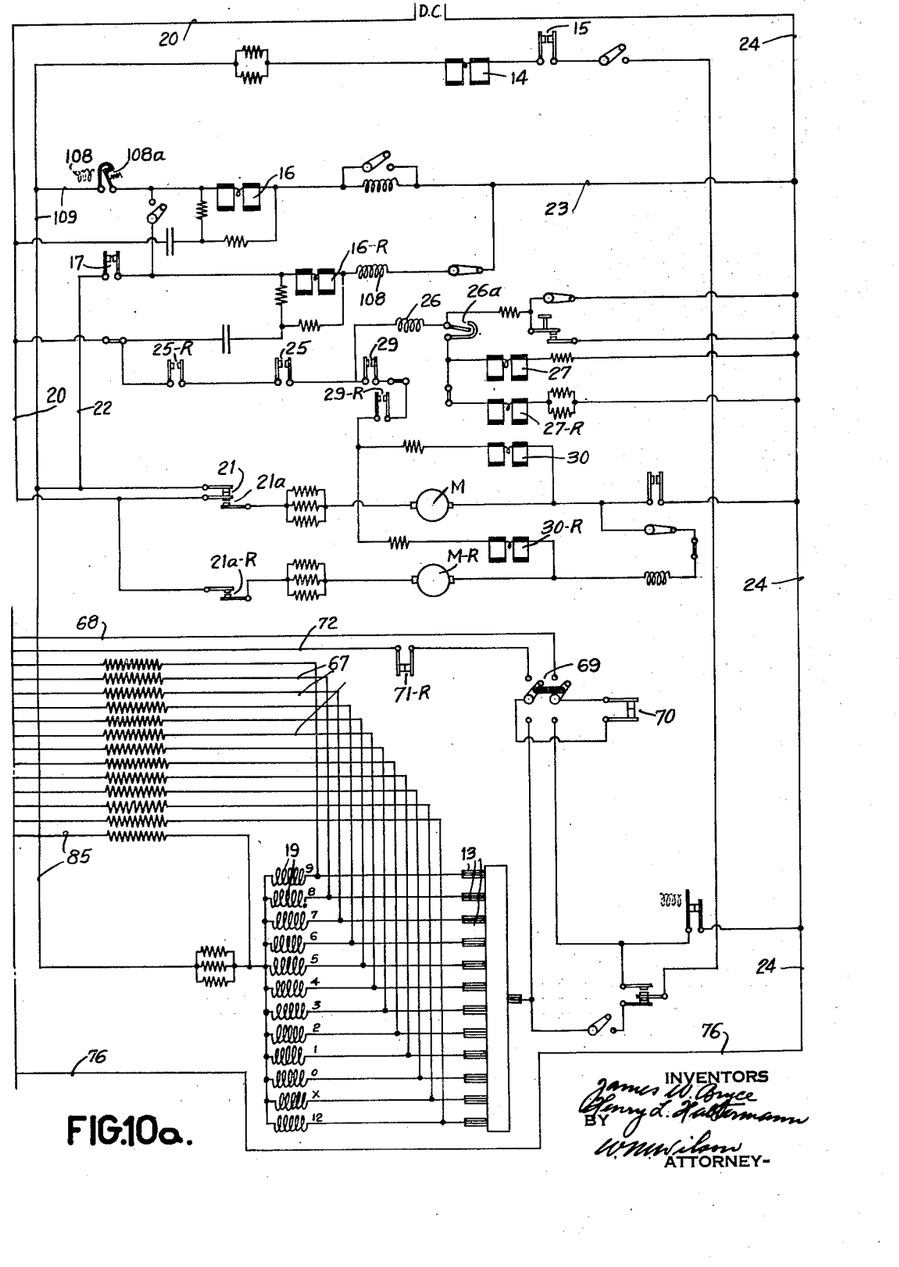

In Fig. 10a is shown the circuit arrangement of a reproducing machine arranged substantially in accordance with the machine shown in the patent to Lake and Daly above referred to.

Figure 1:
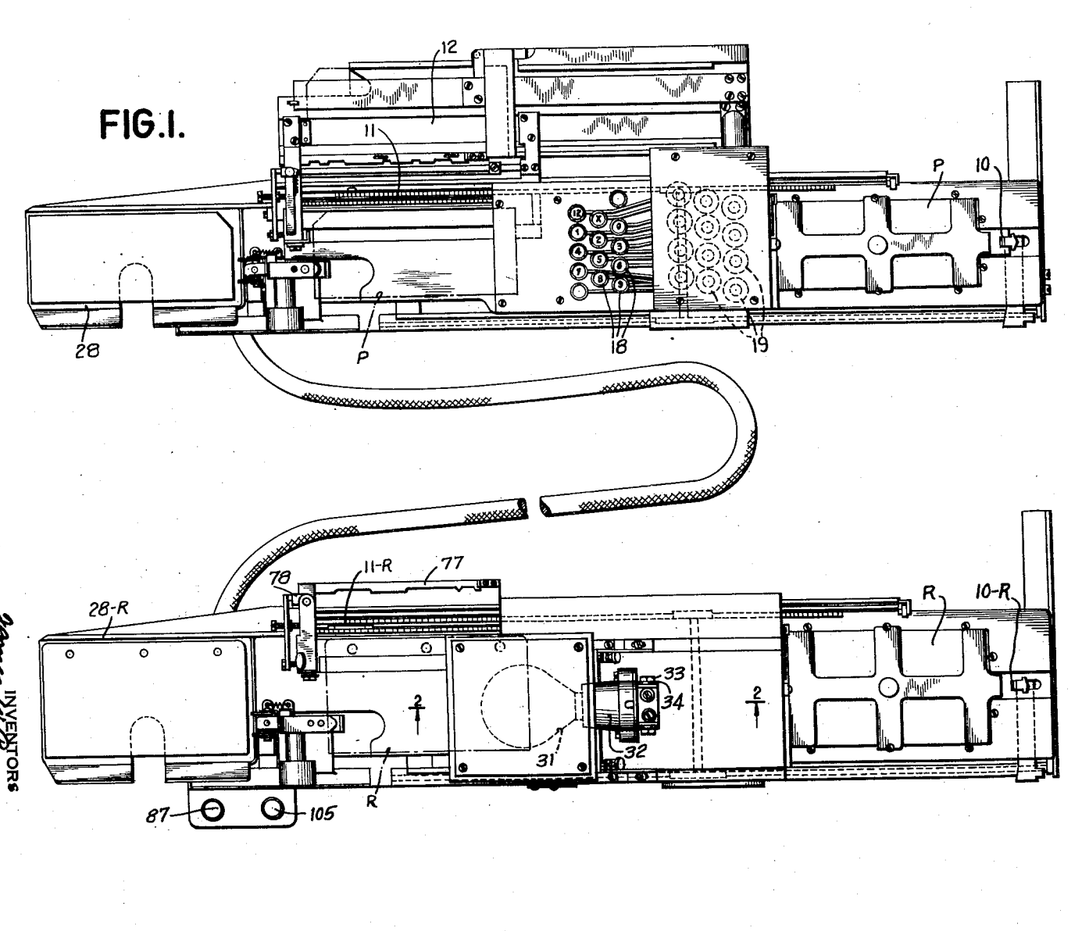
Fig. 1 is an assembly view of the two units of the machine. The lower unit analyzes the meter reader's record to control the punching of a record card in the upper or punching unit of the machine.

A brief description will be given of the general operation of the punching unit as operated under control of the reading unit. In Fig. 1, the punching unit is shown in the upper part of the drawing and the reading unit in the lower part. Both units are provided with relays, magnets, and contact devices, generally indicated in the upper part of Fig. 10a, which control the automatic feeding of the record cards from the supply magazines to the discharge magazines.

Motor M drives the card feeding devices of the punching unit and motor M—R drives corresponding devices in the reading unit. When motors M and M—R operate, they cause movement of pickers 10 and 10—R, respectively (Fig. 1), to feed cards P and R from their respective supply magazines to punching position and analyzing position. At the same time, the card carriages 11 and 11—R are moved toward the right as viewed in Fig. 1, to receive the advanced cards. The carriages are provided with the usual pushers which advance the cards step by step past the row of punches in the punching unit and past the analyzing devices in the reading unit.

The punching unit is provided with the usual master card table 12 on which a pre-punched master card may be positioned to control the automatic punching of repetition data in the record car P. The brushes which analyze this master card 12 are indicated at 13 in Fig. 10a and the brush magnet which moves them in and out of cooperation with the card is indicated at 14, a contact 15 being provided to open and prevent operation of magnet 14 when no master card is in controlling position.

The punching unit is also provided with the usual punch magnet 16 which, upon energization, will operate the punching mechanism to perforate a column of the record card P, if a punch has been selected, and also operate the escapement mechanism to advance the record card P one column or step. The reading unit is provided with a corresponding magnet 16—R which, upon energization, operates the escapement mechanism of the reading unit to advance the record card R one step or column. The punch magnet contact 17 is adapted to be closed whenever a punch is selected for operation either by manual depression of one of the punch selecting keys 18 of Fig. 1 or by electrical selection under control of the punch selecting magnets 19.

Closure of contacts 17 will complete a circuit traceable from the direct current source DC, through line 20, trip magnet contacts 21, which are closed during punching operations, wire 22, contacts 17, then through magnet 16—R, escape relay 108, wire 23, line 24, back to source of current DC. Escape relay 108 closes its points 108a to complete a circuit traceable as follows: from source DC, line 20, trip magnet contacts 21, wire 109, relay points 108a, punch magnet 16, wires 23 and 24, to source DC.

The operation of punch magnet 16 will operate mechanism to open contacts 17. Thus, for each operation of contacts 17, the magnets 16 and 16—R are operated to advance their respective records one step. When both records have completely traversed the punching and reading positions, and are both in so-called "last column position" their carriages will act to close contacts 25 and 25—R, respectively, completing a circuit through the eject relay 26, causing closure of the points 26a thereof, which in turn complete circuits through the eject magnets 27 and 27—R of the punching and reading units, respectively. These eject magnets operate to flip the record cards from the last column position in which they are shown in broken line outline in Fig. 1, into the discharge magazines 28 and 28—R. Upon ejection of the cards, contacts 29 and 29—R are closed and since contacts 25 and 25—R are still closed at this time, circuits are completed through these contacts to energize trip magnets 30 and 30—R which control the operation of contacts 21, 21a and 21a—R. The contacts 21a and 21a—R complete the circuits to motors M and M—R which thereupon automatically feed another card to punching position.

The above briefly describes the sequence of operations carried out in reproducing machines to effect an automatic and continuous feeding of record cards from the supply magazines through punching and reading stations and thence into discharge magazines. Since the spacing of the columns on the record cards P and R are not necessarily alike and the increments of advance of their respective card carriages are different, the usual interlocking contacts and relays are arranged in the several circuits to keep certain of the corresponding operations of the two units in step.

As is usual in reproducing machines and other punching machines of this type, so-called "skip bars" and "column cut-out bars" may be provided with suitable notches in the former to cause automatic skipping of certain fields of the card to be punched and certain predetermined fields of the card to be analyzed. The cut-out bar may be notched to control contact devices to enable or disable the controlling circuits of the reading devices in certain positions. This device will be more fully explained hereinafter. The card feed and punching operations of the machine per se do not form part of the present invention and need not, therefore, be explained in further detail.

Record cards

Figure 8:
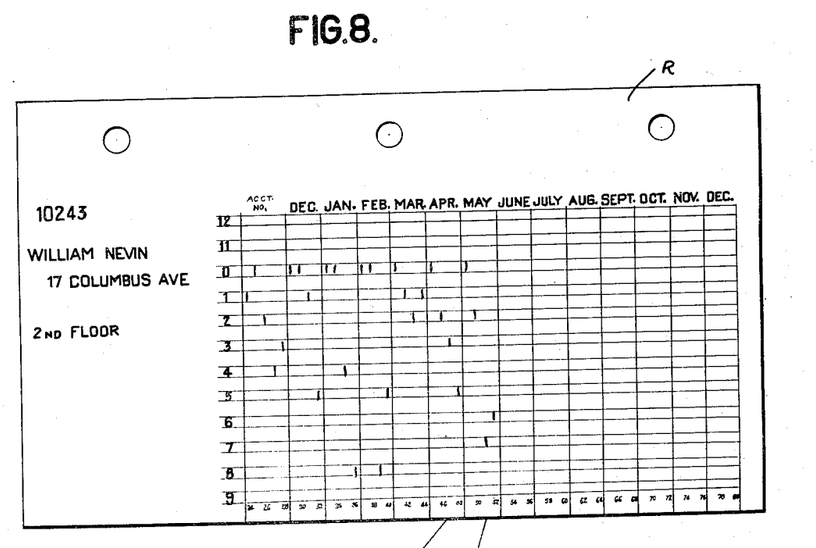
Fig. 8 is a detail of a form of meter reader's original record.
Figure 9:
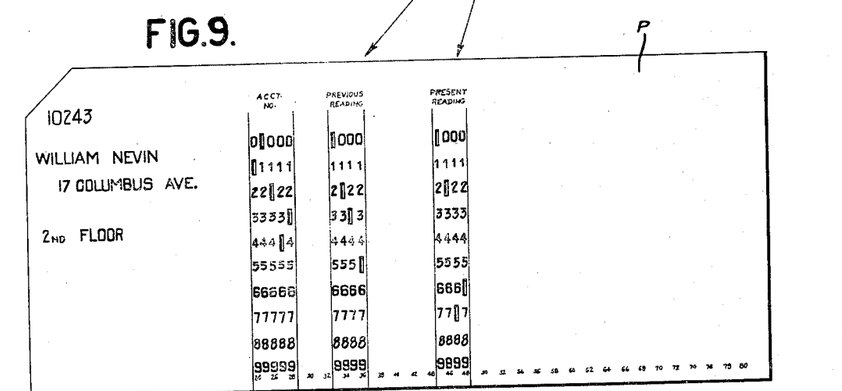
Fig. 9 is a detail of a perforated record prepared in part under control of the record in Fig. 8.

In Fig. 8 is shown the record card R which is analyzed in the reading unit to control the preparation of the record card P of Fig. 9. Card R may be provided with a plurality of fields headed "Dec.", "Jan.", "Feb.", etc. and a field headed "Acct. No." indicating the account number of the particular record.

The meter reader will successively record the readings of the meter corresponding to the account number in the proper monthly fields by making short vertical pencil marks in the proper columns and index point positions of the fields. A stencil may be employed as a guide to the location of the index point positions and the length of mark; or the record may be suitably ruled. The account number field may be similarly marked to represent the number, or the number may be punched therein by forming rectangular holes, as in the corresponding field in Fig. 9.

The skip bar of the reading unit may be notched to cause the card R to skip the left portion of the card past the analyzing devices to bring the first column of the account number field into reading position and to then cause step-by-step movement past this field and then to skip fields "Dec.", "Jan.", "Feb.", "Mar." in succession and to analyze fields "Apr." and "May" and then skip the remainder of the card. The skip bar of the punching unit may be arranged to similarly skip the left end of the card P to advance the account number field step by step and then skip to the first column of the "Previous reading" field which will receive step-by-step punching under control of the marks in the "Apr." field of card R, then skip to the first column of the "Present reading" field where column-by-column punching will take place under control of the "May" field of the R card. The remainder of the card P may then be skipped or, if desired, repetition punching may be effected under control of the master card in accordance with the usual practice.

Comparing mechanism, to be hereinafter described, will first make a comparison between the marks or perforations in the account number field of card R and the perforations in the account number field of card P. If the fields are in agreement, the transference of data from one card to the other may take place and if they are not in agreement, the machine will stop.

Card feeding mechanism

Figures 2, 3:
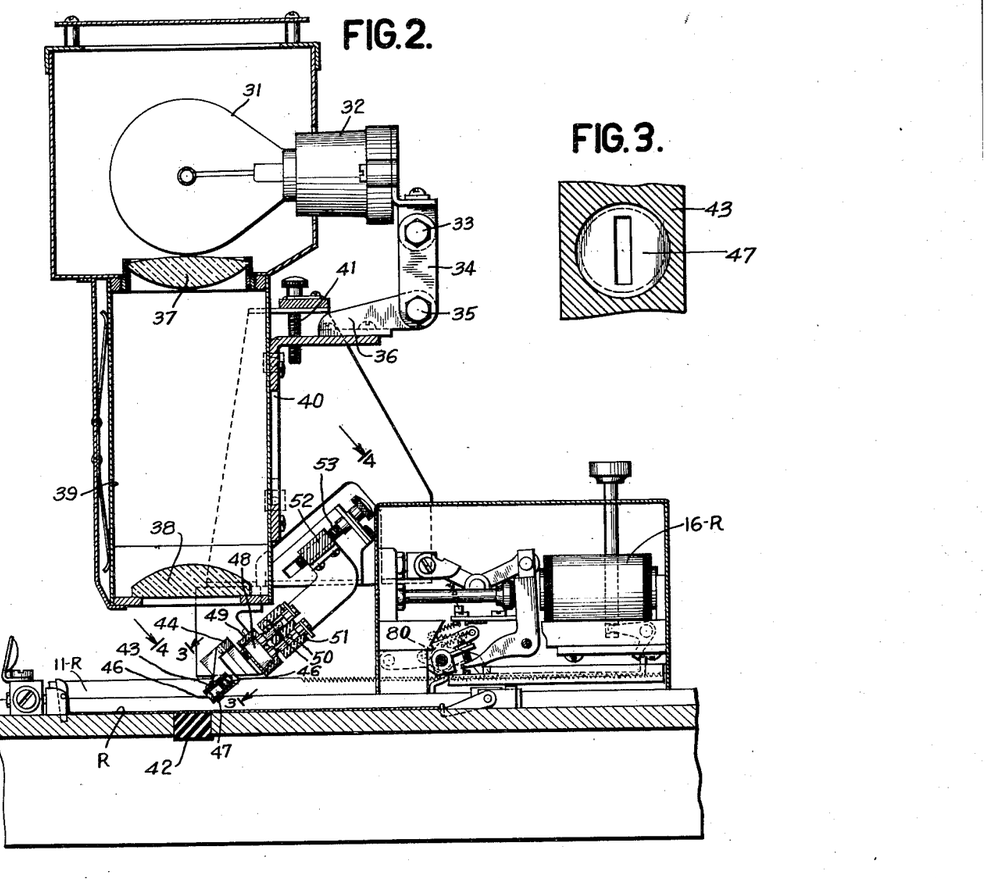
Fig. 2 is a central section taken on the line 2—2 of Fig. 1, showing the optical system for analyzing the marks on a record card.
Fig. 3 is a detail taken on line 3—3 of Fig. 2.

Fig. 2 shows the devices for analyzing or reading the data on the card R as it is moved toward the left under control of the carriage 11—R. A source of light, as bulb 31, is mounted in a suitable socket 32, which is pivotally adjustable on a stud 33 carried by a link 34, which in turn is pivotally adjustable on a stud 35 mounted in a bracket 36, rigidly secured to the frame of the machine. This permits the accurate adjustment of the light filament and assures the proper projection of the light on the card. The light is projected through a double convex lens 37 and thence through a cylindrical lens 38, the two lenses being supported at opposite ends of a hood 39 secured to a bracket 40. The bracket 40 is suitably mounted for vertical movement in the frame of the machine and is further supported by thumb screws 41 by means of which the bracket and projector system may be adjusted vertically.

Figure 4:
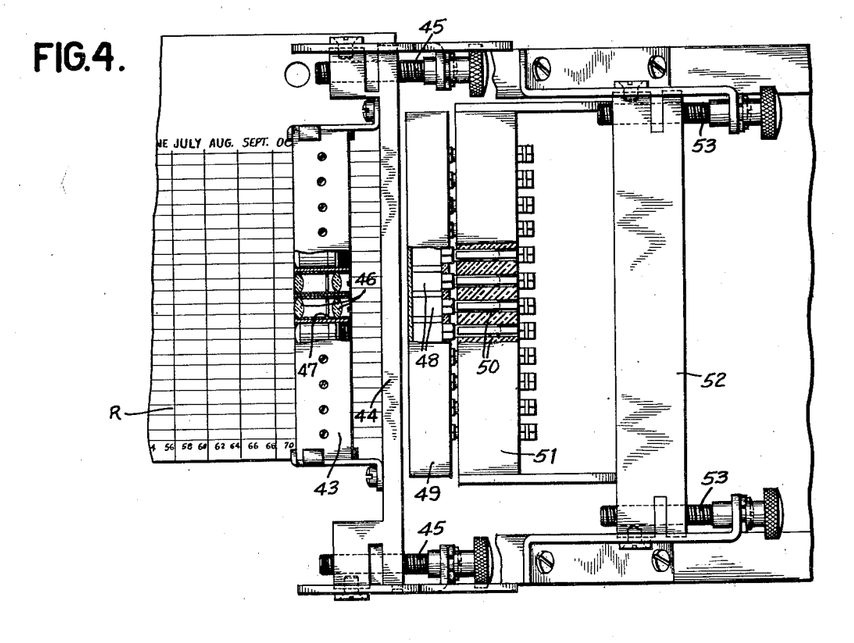
Fig. 4 is a section taken on line 4—4 of Fig. 2, showing the multiple arrangement of the optical systems and the light sensitive cells.

By virtue of the optical system just described, a beam of light is projected on the card R directly above a block 42. This beam of light is in the form of a line extending transversely of the card and including the index point positions in a column. The beam of light is reflected from the card into a secondary optical system which comprises twelve independent optical systems mounted in a block 43 (see also Fig. 4). The block 43 is supported on a member 44 which is obliquely adjustable by means of thumb screws 45 which connect the member 44 to a fixed bracket of the machine.

Each of the secondary optical systems includes a pair of double convex lenses 46 with a slotted disk 47 (see Fig. 3) positioned intermediate the two lenses. The lenses will thereby project a restricted beam of light upon the respective light-sensitive elements. This beam of light will correspond substantially in configuration to the unit areas represented by the index point positions of the column in reading position.

The light-sensitive system comprises twelve light-sensitive cells 48 mounted in a common cell block 49. These cells are of the dry-plate type of photovoltaic cell and each is provided with a pair of terminal prongs 50 which are insertible in suitable connector openings in a block 51 carried by a member 52 which is slidably adjustable for proper focusing by means of thumb screws 53.

These cells comprise a front electrode, a back electrode, and photo-sensitive material between the two. Upon the incidence of light on the front electrode and the consequent transmission of the light rays therethrough to the photo-sensitive material, electrons are emitted and collected by the front electrode. With the front and back electrodes connected to an external circuit, such circuit will change its electrical characteristics sufficient to maintain equilibrium in the subsequent circuits.

As the record card R is advanced step by step past the block 42 (Fig. 2), light will be successively reflected from the corresponding index point positions of the columns in which no marks occur. The occurrence of a mark in any index point position will, of course, prevent such reflection. The block 42 is made of dark, non-reflecting material so that if a perforation is analyzed, the effect will be the same as for a mark.

Record analyzing circuits

Referring now to Fig. 10, the supply of current for the photoelectric and amplifying devices is indicated at AC, indicative of alternating current. With the switch 54 closed the bulb 31 will be illuminated through the transformer 55 and light will be projected through the optical system to the record card and reflected therefrom to the light sensitive cells 48 indicated in the upper part of Fig. 10.

Each cell is wired in series between a potentiometer 56 and the grid 57 of a vacuum tube 58 which is of the screen-grid, indirectly heated, cathode type. The cathodes 59 of each tube 58 are connected to a common return wire 60 which has included therein a resistance 61 and which extends through points 62a of a relay 62, whose operation will hereinafter be explained, to the out-put side of a rectifying unit, generally designated 63. The placement of the resistance 61 in the common cathode return 60 provides sufficient flexibility of bias exerted on the grids 57 simultaneously and without disturbing the grid balance obtained by potentiometers 56 and cells 48 to maintain a reasonably constant emission when the fluctuations of the cathode temperature take place. The change in voltage across the resistance 61, occasioned by an individual tube 58 receiving a signal on its grid 57 from the cell 48 and thereby passing current through the plate resistance 64 and through the plate cathode 65 and on through the common cathode return 60 and thence through resistance 61 which is connected to the negative side of the rectifier, will be of such negligible value as to not exert any controlling effect upon the grid bias of the other tubes. However, should the entire plurality of cathodes 59 change their emission due to a variation in the voltage supplying their respective heaters, there would be a total change of current effective through the resistance 61 which would so change the voltage that the grid bias resulting therefrom would be such as to restore to reasonable constancy the current through respective plate resistances 64.

The sensing of a mark on the record card R by a cell 48 will serve to reduce the intensity of light reflected upon the photo cell 48 which will alter the bias of grid 57 and cause current to flow through the load resistance 64 in the plate circuit of tube 58. The change in voltage across resistance 64 is applied to the grid of a second tube 58a whose plate circuit includes a relay coil 66 which upon energization as the result of the analysis of a mark will close its point 66a. It is, of course, understood that there are twelve amplifying units, one for each of the cells 48, and that there are twelve relays 66, one for each of the index point positions of the record card. Each of the relay points 66a is connected through a wire 67 (see also Fig. 10a) to punch selector magnets 19. A common wire 68 also leads to the relay points and extends (Fig. 10) through a switch 69, normally closed, contacts 70, contacts 71—R, wire 72, relay points 73a, wire 74, low resistance winding 75 of a compound overload relay, wire 76 (Fig. 10a), to one side of D. C. line 24. The circuit through punch selector magnets 19 corresponding to the relay points 66a, which are closed, will therefore be completed provided contacts 70, 71—R and 73a are closed at the time. It will be understood that the brushes 13 are inoperative at this time.

Figure 5:
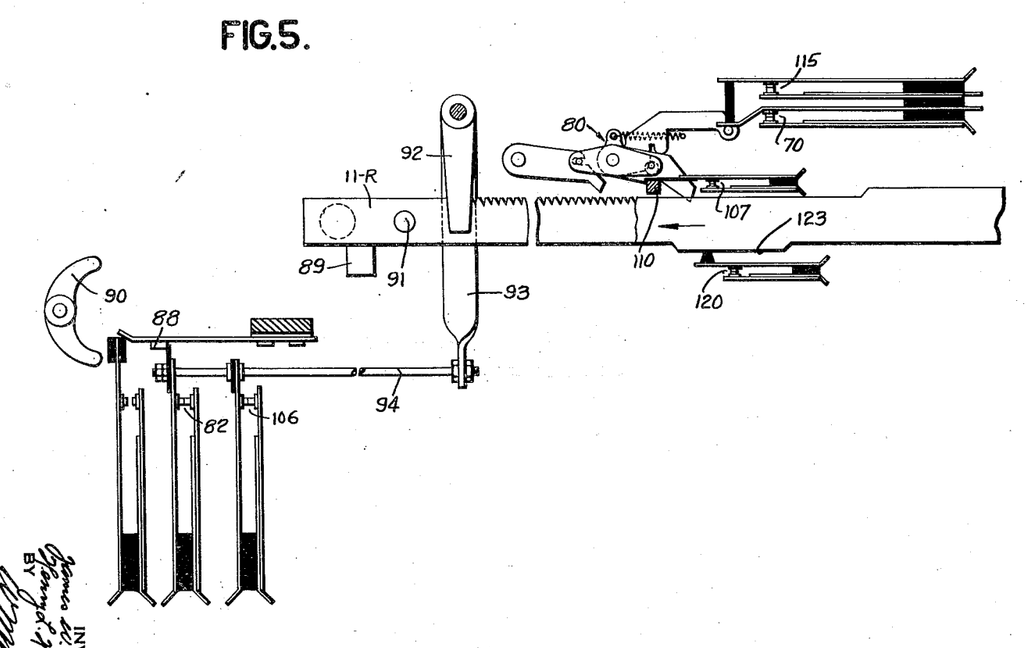
Fig. 5 is a detail of the carriage escapement mechanism of the reading unit.
Figure 7:
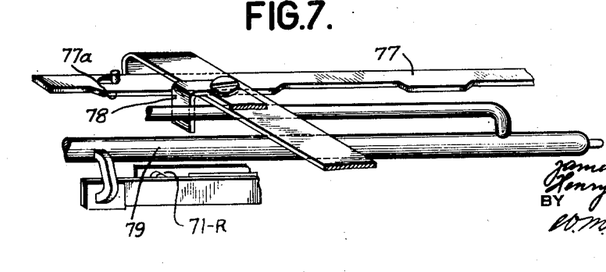
Fig. 7 is a detail of certain contact controlling devices in the machine.

The manner in which contacts 71—R are controlled is illustrated in Fig. 7, which indicates the usual column cut-out bar 77 of the reading unit. This bar is fixed with respect to the machine and is provided with high portions 77a co-extensive with the fields of the card R to be analyzed and having low portions co-extensive with the remainder of the card. The high portions 77a will bear against a pivoted interposer 78, causing it to rock a rod 79, which in turn will cause closure of contacts 71—R as indicated. Contacts 70 are shown in Fig. 5 where they cooperate with the escapement mechanism 80 of the reading unit and are opened thereby for each spacing operation. These contacts serve to break the selecting circuits after a selection has been made.

Contacts 73a are provided to prevent the operation of the selecting circuits and arrest an attempt to punch more than one hole in any column which might be occasioned by the erroneous marking of more than one index point position in a column of the record card R.

As traced before, it is seen that the relay points 66a and the punch selector magnets 19 are substantially in series with the low resistance coil 80 of the overload relay. This relay is so adjusted that it will allow the amount of current necessary to actuate only a single punch selecting magnet to pass therethrough without being energized itself. Should there be, however, two or more marks in the column of the card being sensed, two or more contacts 66a will close and cause the overload relay to be energized through its low resistance winding 75. Energization of winding 75 will cause opening of its points 75b and closure of its points 75a.

The points 81a of the overload relay are also closed to energize winding 81 and set up a holding circuit from wire 76, which, as explained above, is connected directly to one side of the D. C. source, winding 81, contacts 81a, contacts 82 (normally closed), wire 83, relay coil 84, coil 73, wire 85 (see also Fig. 10a), trip contacts 21, wire 20, to the other side of D. C. source. This circuit will remain energized until the record card R has been ejected from the reading unit. The coil 73 in the circuit opens its points 73a and prevents energization of the punch selector magnets 19. The closure of relay points 75a by the overload relay will complete a circuit from one side of the A. C. source to contacts 75a, wire 86, a light 87, which may be of a distinctive color such as red, to the other side of the A. C. source. This light will accordingly remain illuminated until the card is ejected. At such time the circuit is broken by the opening of contacts 82, which are shown in Fig. 5 as being normally held closed by a leaf spring latch 88.

As the reading unit carriage 11—R moves toward the left to advance the card under control of the usual release key mechanism, a pin 89 will strike a pivoted member 90 when the carriage is in last column position and cause latching member 88 to be cammed upwardly to release contacts 82. These contacts 82 remain open until the carriage 11—R has been again returned to the left or starting position, at which time a pin 91 will strike an arm 92 which is integral with a longer arm 93 whose lower end has connection 94 with one blade of contacts 82, causing it to be drawn toward the left into closed or latched position. Relay 84 opens its points 84a to interrupt the plate circuit to the amplifying tubes 58a.

Supervising devices are provided to introduce a slight period of delay before the operating relays 66 are actuated, to provide time for the amplifying tubes to function in a proper manner. A vacuum tube 95 of the conventional screen-grid, indirectly heated, cathode type is provided whose grid 96 and cathode 97 are connected together and whose screen-grid 98 and plate 99 are also connected together. In the plate circuit there are relays 100, 62, 101 and 102, connected in series. Relay 100 is so adjusted as to close before relays 62, 101, and 102. When the A. C. switch 54 is closed and filament 103 heated through transformer 104, the circuit through the heater filament is completed through the normally closed contacts 102a of relay 102 and the cathode 97 accumulates heat until sufficient electrons are ejected to cause an emission of predetermined current sufficient to close the holding relay 100. The closure of the points 100a establishes a return circuit for the current passing through it and relays 62, 101, 102 thereupon also become energized. Closure of relay points 62a will permit completion of the aforedescribed plate circuits of the tubes 58.

Closure of points 101a will complete a circuit from A. C. source, contacts 75b, contacts 101a, lamp 105, back to source. This lamp may be of a distinctive color, such as green, which will thereby indicate that the circuits and the machine in general are functioning properly. Opening of points 102a will break the heating circuit of the filament 103, allowing it and the cathode 97 to cool off and remain inoperative until the holding circuit through the contact points 100a has been broken. The release of the holding circuit is effected by opening the switch 54 to the supply of current. Closure of points 102b completes the plate circuit of the tubes 58a and controls the flow of current therein. This plate circuit also includes the relay points 84a, pairs of contacts 106, and 107. The contacts 106 are shown in Fig. 5 and are open during the return of the carriage to receive a new card. Contacts 107 are shown in Fig. 5 and are open when the carriage is shifted rapidly to the left under control of the usual release key which in the well known manner raises skip lifter 110 to release the escapement mechanism and incidentally open contacts 107.

*Card comparing mechanism*

Figure 11:
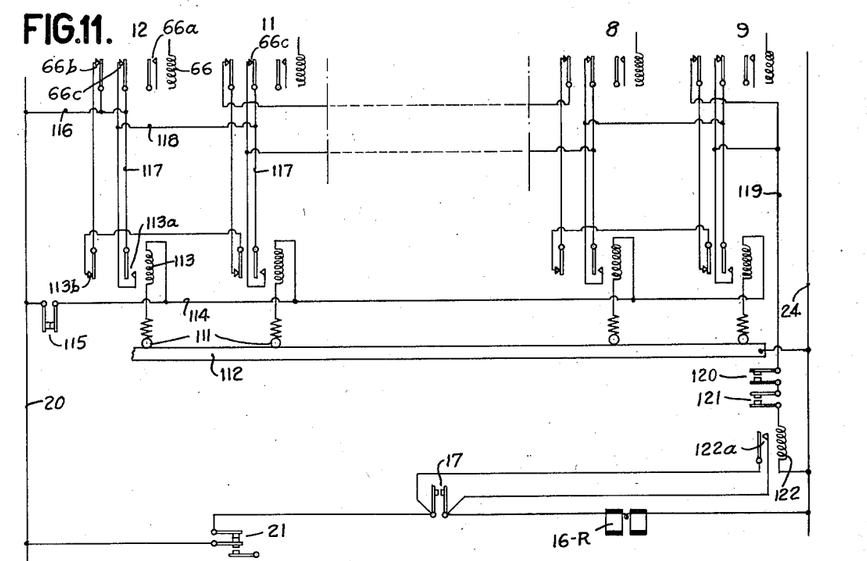
Fig. 11 is a part of the wiring diagram, showing the arrangement of the comparing circuits dissociated from the remaining circuits.

In Fig. 11 is shown the card comparing mechanism for comparing the account number designations on the cards R and P. These circuits are segregated from the circuits in Figs. 10 and 10a for the sake of simplicity and will now be described in detail.

Figure 6:
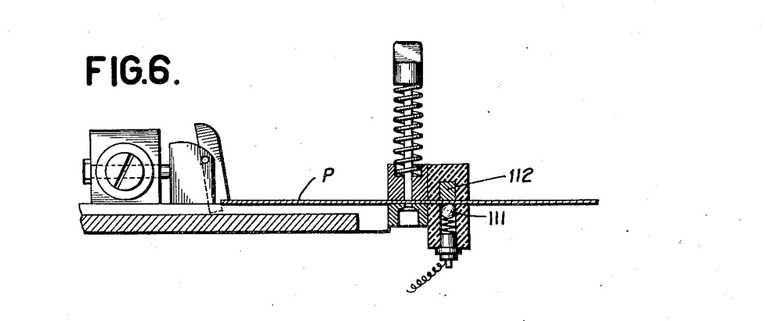
Fig. 6 is a detail of the electrical card analyzing devices of the punching section.

In Fig. 6 are shown the contact devices which analyze the perforations in the account number field of the card P. These devices comprise a plurality of contact balls 111 which contact with a common conducting strip 112 through the perforations in the card P as the card is advanced step by step toward the left.

In Fig. 11, each of the relays 66 is provided with additional normally closed relay points 66b and 66c which are adapted to open when a mark is sensed in the corresponding index point position. Each of the contact balls 111 is connected to one of a series of relays 113 which controls normally open points 113a and normally closed points 113b. The common return line 114 of the relays 113 includes a pair of contacts 115 shown in Fig. 5 as operated concurrently with the contacts 70 and accordingly open during spacing operations of the card carriages. Analysis of a perforation by one of the balls 111 will complete a circuit from right side of line 24, through the common strip 112, perforation in the card P, ball 111, relay 113, wire 114, contacts 115 to left side of line 20, thus energizing the relay and causing closure of relay points 113a and opening of points 113b. If there is a mark in the corresponding index point position of the corresponding column of the card R, the relay 66 will also be energized in the manner explained above and relay points 66b and 66c will be open. A circuit will thereupon be completed from left side of line 20, wire 116, wire 117, (assuming a mark at "12") closed relay points 113a, wire 118 to the wire 117 in the next or "11" position, contacts 66c and from there in series through the contacts 66c in the remaining orders, to wire 119, through contacts 120, contacts 121, relay 122, to right side of line 24. Contacts 120 are shown in Fig. 5 and are adapted to be closed by a depending portion 123 to the reading unit skip bar which is so located as to close contacts 120 only during the analysis of the account number field of card R. Contacts 121 are controlled by the column cut-out bar of the punching unit in the same manner as contacts 80 71—R in Fig. 7. This bar is arranged to close contacts 121 only while the account number field of card P is in cooperation with the contact balls 111. Under control of contacts 120 and 121 the comparing mechanism will be operative only during the analysis of the account number field.

Relay 122 will, upon energization, close its points 122a which are arranged in a shunt circuit around the punch contacts 17 and will accordingly complete the circuit substantially as traced above through the escapement magnet 16R which, as already pointed out, will in turn control the circuit through the punch magnet 16 so that both card carriages will be escaped to advance their respective cards to position for analysis of the next succeeding column. If the location of the perforations in the corresponding columns of the two cards are not in agreement; that is, if one card is perforated, say in the "6" index point position and the other card in the "7" index point position, the circuit just traced will not be completed and no escapement action will take place, thus apprising the operator that there is a disagreement and he can then remove the cards. Examination of the circuit in Fig. 11 will disclose that if there are no perforations in the corresponding columns sensed, the comparing circuit is completed and the cards will be advanced, thus permitting the operation of the machine for types of cards wherein some may contain account numbers and others be left blank or perforated in a lesser number of columns than the capacity of the account number field.

Figure 12:
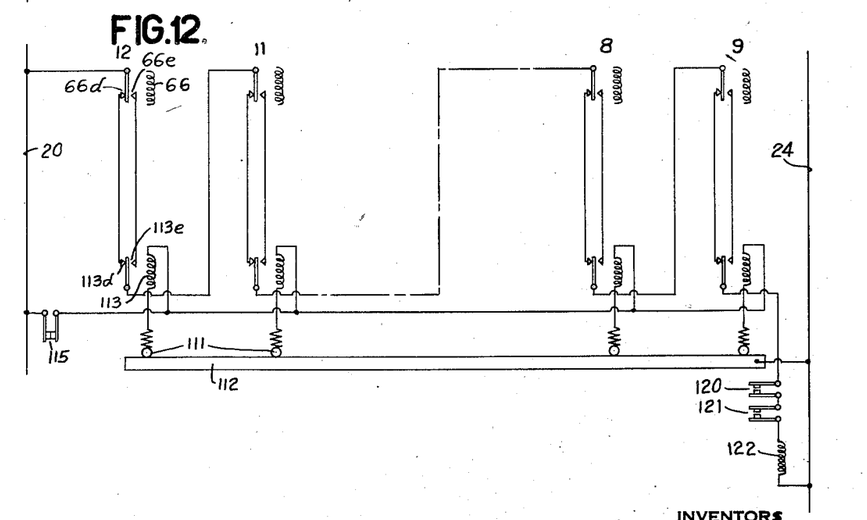
Fig. 12 is a modified form of comparing circuit.

In Fig. 12 is shown a modified form of comparing circuit in which the comparing circuit extending serially through relay points 66d and 113d of the several orders is normally completed upon closure of contacts 120 and 121. This series circuit will be broken if one of the cards is perforated in an index point position and the other contains no perforation at all; that is, the circuit will detect missing perforations. It will be obvious that energization of either of the relays 66 or 113 will shift the comparing circuit in that position through either contacts 66e or 113e and it is necessary for the other corresponding relay to also shift this circuit through its points 113e for completion.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a machine of the class described, means for analyzing a plurality of index point positions in a column of a record card for designations therein, punching mechanism controlled thereby and means controlled by said analyzing means upon analysis of more than a predetermined number of designations for preventing operation of said punching mechanism.

2. In a machine of the class described, light sensitive means for analyzing a plurality of index point positions in a column of a record card for graphical representations therein, punching mechanism controlled thereby, and means including relay devices operatively controlled by said analyzing means upon analysis of more than a predetermined number of graphic representations in a column for preventing operation of said punching mechanism.

3. In a machine of the class described, means for analyzing a plurality of index point positions in a column of a record card for designations therein, punching mechanism controlled thereby, a signal and means controlled by said analyzing means upon analysis of more than a predetermined number of designations for preventing operation of said punching mechanism and for causing operation of said signal.

4. The invention according to claim 3 in which means is provided for maintaining said signal in operation.

5. In a machine of the class described, a plurality of light sensitive elements for analyzing the index point positions of a column of a record card, a plurality of thermionic valves each controlled by one of said elements, punching devices controlled by said valves, a plate resistance for each valve, a common cathode circuit for said valves and a resistance included in said circuit for controlling current through said plate resistance.

6. In a machine of the class described, means for separately analyzing a plurality of records each of which has differently characterized representations thereon, means for comparing the different representations on said records, punching means controlled by one of said analyzing means and means controlled by said comparing means for controlling the operation of said punch controlling analyzing means.

7. In a machine of the class described, means for analyzing the index point positions of a column of a record card having perforations and graphic representations thereon, punching mechanism and means controlled by said analyzing means for causing operation of said punching mechanism in response to said perforations and to said graphic representations.

8. In a machine of the class described, means for analyzing the index point positions of a column of a record card having either perforations or graphical indicia therein, punching mechanism and means controlled by said analyzing means for causing operation of said punching mechanism in response to either perforations or graphical indicia in said index point positions.

9. Record analyzing means for a punch controlling machine including a light sensitive element for exploring an index point position of a record card, a thermionic valve controlled thereby, a punch controlled by said valve, a plate circuit for said valve, a second valve and means controlled thereby for controlling the completion of said plate circuit.

10. In a machine of the class described, having means for feeding a record bearing graphical indicia, means for feeding a record having perforations, light sensitive means for analyzing the first named record, a punching mechanism controlled thereby in accordance with said analysis, means for analyzing said second named record and means jointly controlled by both of said analyzing means for preventing the operation of said punching mechanism under control of said first named analyzing means.

11. The invention in claim 10 in which said punching mechanism is controlled to perforate said second named record.

12. In a machine of the class described, analyzing means, means for moving a record card past said analyzing means step by step to cause column by column analysis of the card, comparing devices and punching devices each adapted to be controlled by said analyzing means and means controlled in accordance with the position of the card for associating said analyzing means with either of said two devices.

JAMES W. BRYCE.
HENRY L. HALTERMANN.